July 7, 1959     J. E. TROTTIER     2,894,148
PLURAL GENERATORS HAVING HIGH SAFETY INTERCONNECTIONS
Filed April 8, 1957     3 Sheets-Sheet 1
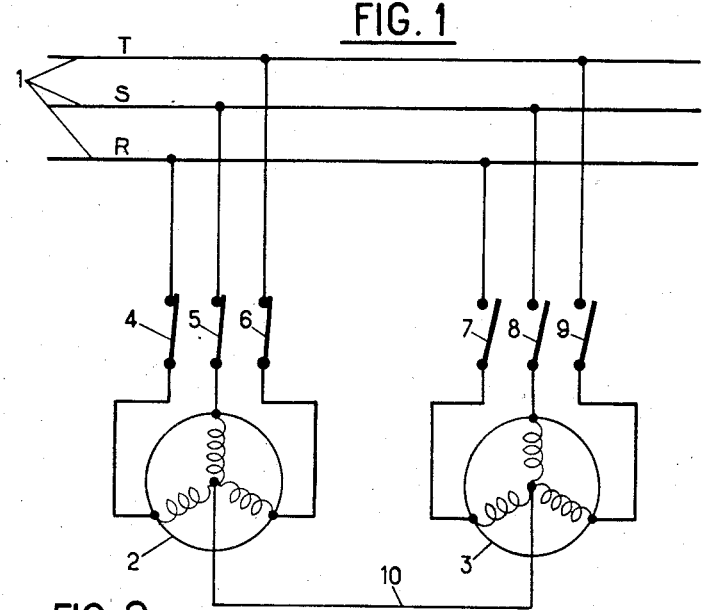
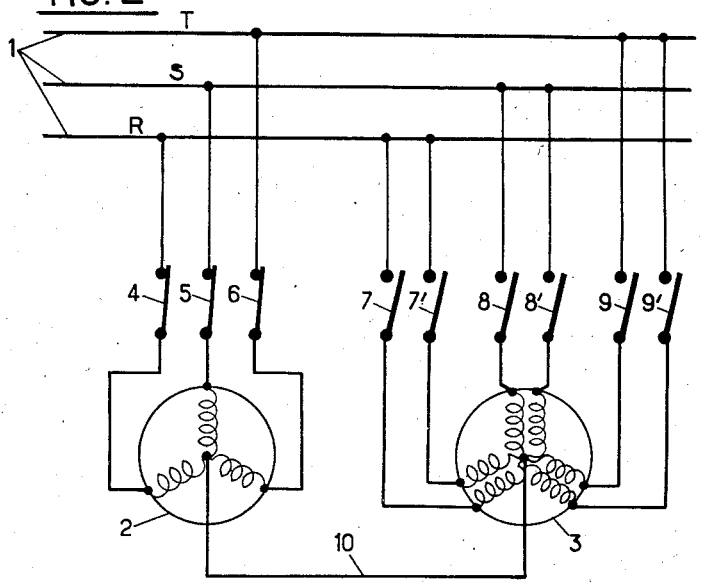
INVENTOR
Jean Emile Trottier
ATTORNEYS

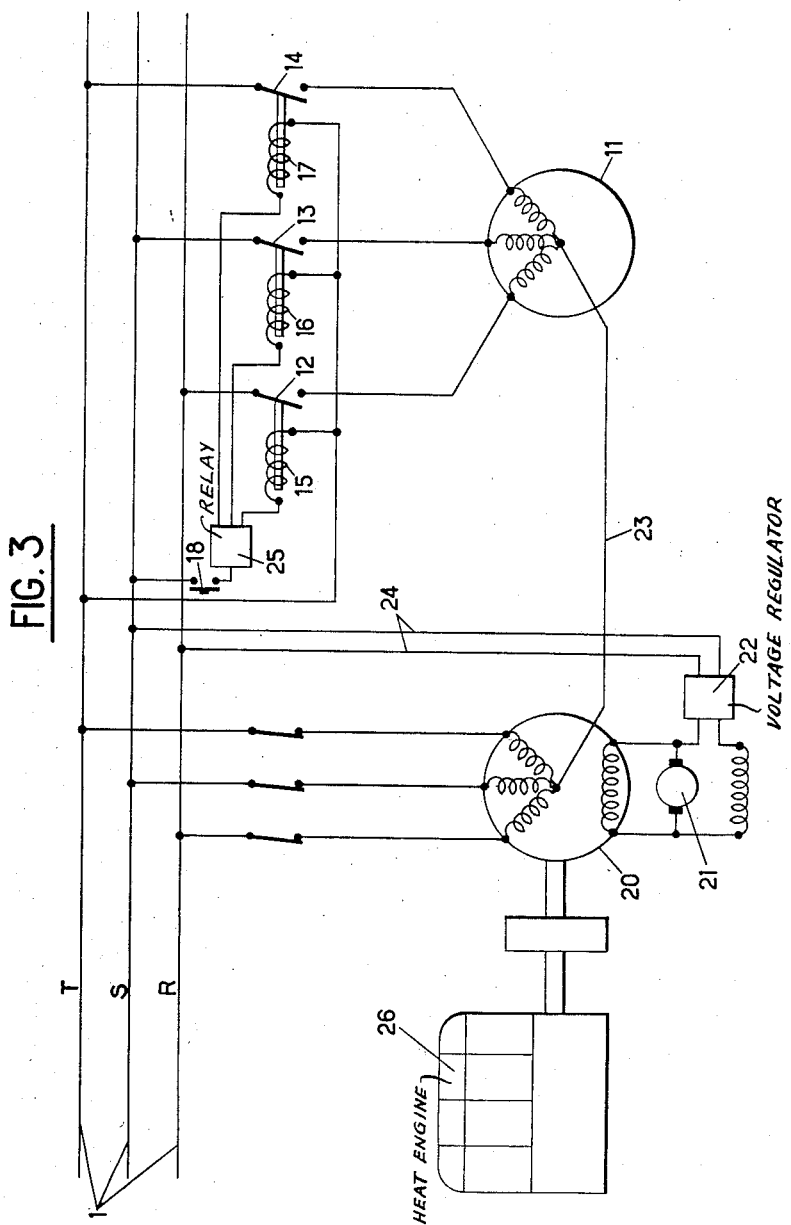

July 7, 1959           J. E. TROTTIER           2,894,148

PLURAL GENERATORS HAVING HIGH SAFETY INTERCONNECTIONS

Filed April 8, 1957           3 Sheets-Sheet 3

INVENTOR
Jean Emile Trottier
By Holcomb, Wetherill & Brisebois
ATTORNEYS

Patented July 7, 1959

2,894,148
PLURAL GENERATORS HAVING HIGH SAFETY INTERCONNECTIONS

Jean Emile Trottier, Neuilly-sur-Seine, France, assignor to Societe a Responsabilite Limitee dite: Societe Gram-Electric, Pantin, Paris, France, a corporation of France Application April 8, 1957, Serial No. 651,350

Claims priority, application France April 12, 1956

13 Claims. (Cl. 307—47)

The object of my invention is to provide highly dependable polyphase A.C. electrical apparatus. This apparatus offers substantial operating advantages over comparable apparatus already known by reason of a novel combination of features embodying in particular means for connecting polyphase machines in parallel by a method which is simpler than conventional methods and which utilizes a new method of regulating the voltage and special means for guarding against the effects of short circuits.

By reason of the aforesaid combination of means for carrying out the invention, the operation of such apparatus offers the advantage of an ease and safety of operation heretofore unknown. This advantage is of particular importance in installations which require absolute safety, such as those installations which supply electricity for the auxiliary services aboard ship.

The invention is hereinafter described with reference to the accompanying drawings on which certain examples are shown purely by way of illustration, without limiting the scope of the invention to the structural details thereof:

Figure 1 is a diagram illustrating a method of coupling two three-phase alternators by successively coupling the individual phases in accordance with the invention;

Figure 2 is a diagram illustrating a method of coupling two three-phase alternators in parallel;

Figure 4:
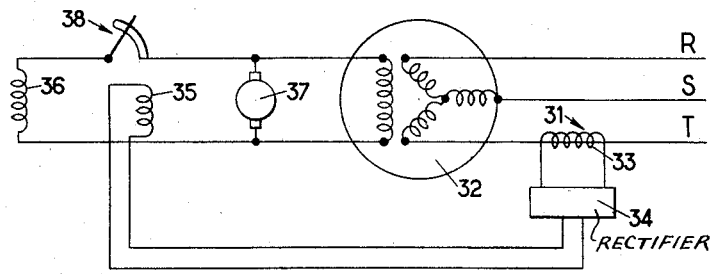
Figure 5:
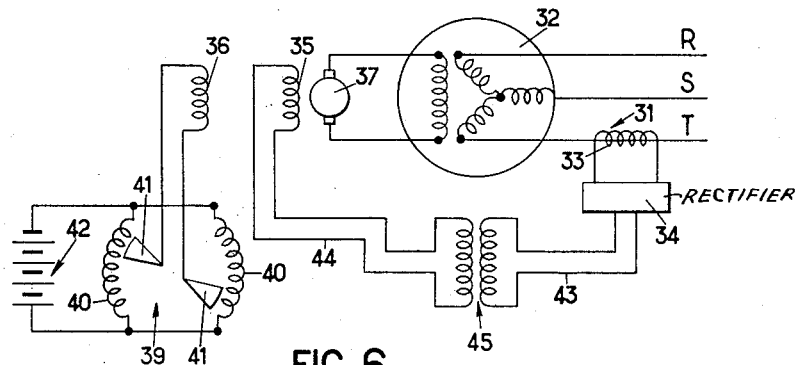
Figure 6:
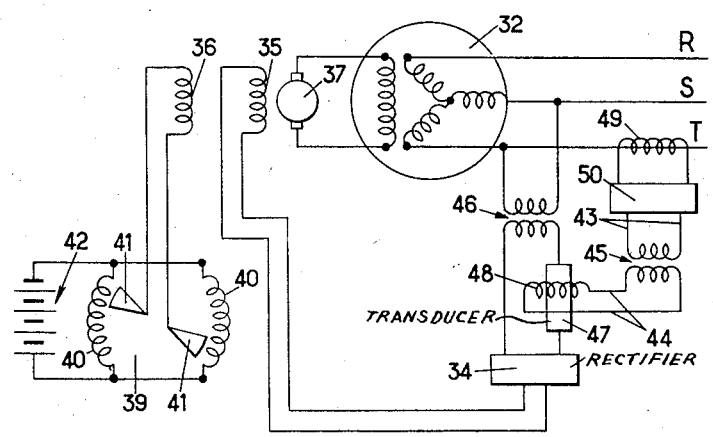

Figure 3 schematically illustrates another embodiment having means for maintaining the supply voltage of the auxiliary apparatus;

Figures 4, 5 and 6 relate to a quick acting voltage regulation system incorporated in the invention.

My invention relates to means for connecting polyphase electrical machines in parallel with an accessible neutral point and comprises means for accomplishing the following steps:

(a) The successive connection of the phases of the machine to be connected, or of separate parallel circuits of which each group constitutes one phase;

(b) The provision of time intervals between successive connections which are longer than the time required to reestablish the voltage, by means of an automatic regulator, preferably having a rapid response of the order of tenths of a second;

(c) Connection of the neutral points to each other by means of an electrical connection which is not necessarily permanent, but which lasts at least as long as the coupling operation.

According to Figure 1, in an installation comprising the bus bars 1 (RST) an alternator 3 is to be connected to the bus bars 1 which are already supplied by an alternator 2. The alternator 2 is connected to the bus bars 1 by a three pole switch or a group of three single pole switches 4, 5, 6, all of the contacts of which are supposed to be closed. The operation to be effectuated is the connection of the alternator 3 to the bus bars (RST) through the three-pole switch 7, 8, 9, all of the contacts of which are initially open.

On the other hand, according to an essential characteristic of the invention, the neutral points of the alternators are connected either permanently, or at least until the coupling has been completed, by means of a conductor 10.

With the alternator 2 running and supplying its normal current and voltage, the first step is to establish by conventional means approximate equality between speed, frequency and voltage of the alternator 3 and that of the alternator 2, by controlling the motor of the alternator 3 and its excitation.

When these approximate equalities have been attained, the switch of one of the phases of the alternator 3, for instance the switch 7, is closed, without attempting to synchronize the phases of the alternators. A single phase current is thereby established in the circuit comprising the phase R of the alternator 3, the single phase conductor connecting it to the bus bar 1R through the single pole switch 7, the conductor and switch of the phase R of the alternator 2 and the conductor 10 connecting the neutral points of the two alternators. This current creates a synchronizing torque between the two alternators which acts on the alternator 3 to bring it into phase synchronism with the alternator 2. When this phase has been brought into synchronism, or when the phase difference has been sufficiently reduced, the same operation is carried out with respect to the closing of switch 8, and then with respect to switch 9, thus completing the connection in three successive steps. If conditions permit, the switches 8 and 9 may be closed simultaneously, thus completing the connection in two steps.

The operating characteristics of the apparatus described are very different from those of conventional apparatus for simultaneously connecting all phases, and manifest substantial advantages.

To begin with, exchanges of power between the two machines when connected phase by phase are limited to a fraction of those which take place when all three phases are connected simultaneously.

Variations in voltage are consequently substantially reduced. When the assembly comprises automatic regulating means controlling the excitation of each alternator and the switches associated with the individual phases are closed at intervals a little longer than the time required to reestablish the normal voltage of the alternator in service, the final coupling is accomplished without excessive voltage variation.

As will readily be seen, the object of the method of connecting in parallel constituting my invention is to replace a single step with a succession of smaller elementary steps, which do not interfere with the proper functioning of the apparatus being supplied, especially motors and their auxiliary equipment, and which, in particular, permits a sufficient voltage to be maintained at the terminals of the contactor coils.

Figure 2 is a diagram of an installation in which the alternator to be connected up comprises armature phases consisting of parallel circuits operating in parallel after connection to the bus bars. In the case illustrated, the alternator to be connected comprises two circuits per phase, but could of course comprise a larger number.

The phases RST of the set of bus bars 1 lead respectively to groups of two single-pole switches 7 and 7', 8 and 8', 9 and 9'.

The operator successively closes one circuit per phase, then the second circuits of each phase, for example, the switches 7, 8, and 9, then the switches 7', 8', 9'. Synchronizing torques are thus obtained for each phase, and these are subsequently reinforced by those resulting from the closing of the second series of switches.

Of course, the successive closing of the single pole switches in the proper order may be insured by means of an automatic device actuated through a series of auxiliary contactors controlled by a series of time delay relays, the proper timing for which has been experimentally determined.

The process and apparatus hereinbefore described may be applied to the connection of synchronous motors in parallel to a polyphase network, when modified as follows. In this case the automatic regulation of the excitation of the synchronous motor to be connected up, which was not indispensable in the case of an alternator, becomes useless.

This method and apparatus are equally applicable to the starting of asynchronous motors and are particularly useful in connecting squirrel cage motors having single or double cages to a polyphase network, the flow of current being substantially reduced as well as the corresponding fluctuation of the voltage.

In this case, the motors are equipped with Y-connected induction coils with the neutral points brought out, the neutral point of the motor being connected to the neutral point of an alternator or to a neutral bar on the switchboard.

According to another embodiment of the invention, the apparatus comprises means for preventing the voltage at the terminals of the single phase elements of the means for controlling the apparatus, particularly the coils of the contactors, from falling below its normal value.

According to Figure 3 a polyphase asynchronous motor 11 (three phase, for example) of the squirrel cage type, having preferably a double cage, is supplied by current furnished by a set 1 of bars RST, through three single pole switches 12, 13 and 14, each of which closes the circuit formed by one of the phases, the coils 15, 16 and 17 of which are fed between the same phases ST of the set of bus bars 1 through a relay having a clockwork movement, which is adapted, when actuated by the starter switch 18, to close the switch 12 and then, about half a second later, close the contactors 13 and 14.

The half-second interval is given merely by way of example; the interval need merely be slightly longer than the time required to reestablish the normal voltage on the bus bars RST, after a variation therein.

The time required for the reestablishment of the normal voltage depends on the speed with which the voltage regulator 22 acts and the time constants of the various excitation circuits of the exciter 21 and the alternator 20 which supplies the motor 11.

In practice, the time required to reestablish the normal voltage of an assembly constituted by the heat engine 26, the alternator 20, the exciter 21 and the automatic voltage regulator 22 is about ¼ or ½ of a second. The clockwork of the relay 25 may thus be set to supply the coils 15, 16, 17 of contactors 12, 13, 14 at an interval of about half a second. If the time required to reestablish normal voltage were greater, it would be necessary to set the relays 25 for longer intervals.

In the example selected, the automatic voltage regulator 22 is connected between the phases RS, by the two phase circuit 24, it being supposed that this regulator is of the single phase type and that the phases R, S are the reference phases from the point of view of regulation.

The first set of contacts to be closed is that of phase R, the next that of phase S, and the last is that of phase T.

The order of closing having been thus established, it follows that the phases R, S are the first to be affected by the voltage drop in the circuit constituted by the phase R, the contactor 12, the conductor which connects this contactor to the motor 11, and the neutral wire 23.

The regulator immediately reacts against this influence, and since the other phase S, T is open circuited, a voltage equal to or greater than the normal value will appear thereacross, the difference corresponding to the voltage drop which exists in the phase R and that which might take place in the phases S and T being less and eventually falling to zero.

It has been specified that the coils 15, 16 and 17 of the contactors 12, 13 and 14 are connected between the phases S, T. The voltage across them is thus slightly increased for some tenths of seconds, which does not affect their longevity but, on the contrary, helps to maintain their contacts in good condition.

Then, when the second contactor 13 closes, the intermediate phase ST begins to be influenced by the voltage drop in the phase S, but the automatic voltage regulator has already established a higher flux in the alternator 20.

The tendency of the voltage to drop is consequently not great, and since there is no voltage drop in the phase T, the voltage across the intermediate phase ST will still be greater than that across the intermediate phase RS.

When the contactor 14 finally closes, the voltage of the intermediate phase ST returns to normal, since all the phases R, S and T carry at this moment the same current, but the voltage never falls below its normal value because the field coil of the alternator is much more nearly saturated at the moment when this last contact is completed.

To sum up, as long as the alternator 20 is capable of maintaining the normal value of the voltage at its terminals, the starting of a motor absorbing all of its apparent power, and even much more, may be accomplished without subjecting the single phase elements of the apparatus such as the solenoids of the contactors to the voltage drops prejudicial to their satisfactory operation, which would occur if the three contactors 12, 13 and 14 were closed simultaneously.

The same result may be attained if the alternator 20, instead of being alone, is in parallel with another, the motor 11 being consequently more powerful.

The process is particularly suitable for application to ships where the central power is relatively moderate in comparison with the power of the auxiliaries installed and where it is important that the starting of a large unit does not inopportunely open the contactors of other auxiliary devices indispensable to the propulsion of the ship or the control of its navigation.

Not only does the voltage on the intermediate phase ST remain substantially equal to its normal value and generally slightly higher, but in the other phases the voltage drop is much smaller than that which would occur if starting were carried out in the conventional manner, that is to say, if the three contactors 12, 13 and 14 were closed simultaneously.

The embodiment hereinbefore described could, without departing from the basic concept of the invention, comprise different elements from those hereinbefore described. For example:

The single phase voltage regulator 22 may be replaced by a three-phase voltage regulator. In this case, a three wire circuit is substituted for the two pole circuit 24, the regulator then maintaining the normal voltage, and the solenoids of the contactors always having their terminals at a voltage which never falls below the normal value.

According to another variation, the solenoids of the contactors may be connected between a phase and neutral. In the example described they would be connected between the phase T and neutral, thus utilizing the phase corresponding to the last contactor closed.

As shown in Figure 4, a conventional arrangement comprises means for compounding alternators, utilizing the direct action of the variation of the intensity of the excitation of the alternator or of its exciter. According to Figure 4, this simple apparatus comprises a current transformer 31 inserted in one phase of the alternator 32, which supplies through its secondary circuit 33 a current rectifier 34, which supplies a special winding 35 concentric with the conventional exciting winding of the exciter 37, and equipped with a rheostat 38. This system, while quick and simple, has the disadvantage that any increase in the excitation of the exciter depends exclusively on the increase in the flow of current supplied by the alternator, and as is well known, the excitation required to maintain a constant voltage at the terminals is not the same if the power factor, the heating and the speed vary.

According to the invention, and as shown in Fig. 5, the apparatus comprises a combination of two devices, each having a distinct role and utilizing equally distinct means, which constitute an assembly which insures the reestablishment of the normal voltage within a very short time after any variation in load.

In order to prevent either of these devices from interfering with the proper functioning of the other and from causing undesirable oscillations, the device utilizing the compounding principle only comes into action for the very short time during which the load is changing. As soon as stable conditions have been reestablished, it has no further effect on the alternator or its exciter.

As shown on Fig. 5, a regulator 39, which may be of the type comprising two rolling sectors 41, for example, provides for regulation of the voltage under substantially stable conditions, that is to say, when there are no sudden variations in load, whatever the power factor, speed and heating of the alternator may be. This device is not required to operate very rapidly, but merely to regulate the voltage with the desired precision, when stable conditions have again been established. For this purpose it suffices to regulate the voltage with a reasonable degree of damping. The regulator may be mounted as a double potentiometer, that is to say that its regulating resistances are connected in parallel to the terminals of a storage battery 42 and that the sectors 41 are connected to the normal excitation winding 36 of the exciter. This arrangement has the advantage of permitting a reversal of the current in the winding 36 when there is a sudden discharge from the alternator, thus limiting the increase in voltage above the rated voltage.

The quick action device which supplements the regulator 39 only during the time when the load is changing consists of a current transformer 31 mounted in one of the phases of the alternator 32. The transformer 31 supplies a rectifier 34 through the circuit 33. To facilitate the explanation, the transformer 31 and the rectifier 34 are shown as single phase. In practice, however, a three phase system, connected to all three phases of the alternator instead of only one, would be provided.

The rectifier 34 supplies the primary of a driving transformer 45 through the circuit 43 and the secondary of this transformer feeds the regulating winding 35, which is concentric with the normal exciting winding 36 of the exciter 37, through the circuit 44.

When the alternator 32 supplies a steady flow of current, the transformer 31 delivers to the circuit 33 and the rectifier 34 an equally steady flow of alternating current at the frequency of the current of the alternator 32. The rectifier 34, in its turn, delivers a steady flow of direct current to the circuit 43 and the primary of the driving transformer 45. Since this is a steady direct current, no current flows in the secondary of the transformer 45, in the circuit 44, or in the winding 35.

On the other hand, when there is a fluctuation in the current delivered by the alternator 32, the flow of direct current in the circuit 43 varies and a current of the same type consequently appears in the circuit 44, that is to say a current which increases and decreases with that in circuit 43.

A current then arises in the winding 35 and increases as the current supplied by the alternator 32 increases this effects a substantially instantaneous increase in the excitation of the exciter 37 well before the mobile equipment of the regulator 39 begins to move. It is easy to so arrange the speed of the latter that the two actions succeed each other without difficulty. By appropriately dimensioning the transformer 31, the rectifier 34 and the transformer 45, the excitation of the exciter 37 may be substantially boosted.

Figure 6 illustrates a variation of the quick action voltage regulator. The rectifier 34 is supplied by a voltage transformer 46, the primary of which is connected across two output conductors of the alternator 32. As in the previous instance, this rectifier 34 and the transformer 46 may be three phase rather than single phase, and connected to the three phases of the alternator instead of one. However, between the rectifier 34 and the transformer 46, a variable reactance 47 is inserted. As is well known, the reactance of this type of apparatus varies with the excitation and it is the function of the exciting coil 48 of the variable reactance to vary it within wide limits.

The rectifier 34 directly supplies the regulating winding 35 of the exciter 37, but as long as the current in the excitation coil 48 is zero, the reactance is large enough to prevent any useful and substantial current from reaching the rectifier 34. The excitation coil 48 is fed through the circuit 44 by the secondary of a driving transformer 45, the primary of which is fed, as in the case of Fig. 3, through a circuit 43, a rectifier 50 and a voltage transformer 49. As in the previous case, there is no current in the circuit 44 and, consequently, in the excitation coil 48, as long as the flow of current supplied by the alternator to the primary of the current transformer 49 is constant. But if there is a sudden increase in the magnitude of this current, a direct current arises in the circuit which saturates the variable reactance 47 and the rectifier 34, being fed, in turn delivers current to the circuit 35. The excitation of the exciter 37 is consequently increased while the load of the alternator 32 is increasing.

The device described in Fig. 6 is slower than that of Fig. 5 by reason of the presence of the variable reactance 47 and its time constant, but has the advantage, despite its greater complexity, of permitting the use of a smaller and cheaper transformer 46 and a smaller and cheaper rectifier 34 since these devices are, in the arrangement shown in Figure 6, only brought into service at the moment at which the load changes and only during the time the change is taking place.

The apparatus embodying the invention comprises means for protecting against short circuits which, with the aforementioned high reactance alternators, permits any arc arising to be extinguished, and the voltage then reestablished across the bus bars.

What I claim is:

1. Apparatus for connecting in parallel a plurality of polyphase electro-magnetic machines having neutral terminals, comprising an individual switch through which each phase of at least one of said machines is connected to the corresponding phase of at least one other machine with which it is to be connected in parallel and an electrical connection between said neutral points.

2. Apparatus according to claim 1 in which at least one of said machines is an alternator and an alternator already in service has an exciter, the excitation of which is controlled by a quick acting automatic voltage regulator.

3. Apparatus for connecting together two polyphase electro-magnetic machines, each having a neutral terminal and said neutral terminals being connected together, said apparatus comprising automatic voltage regulating means connected across a pair of the output terminals of one of said machines and across the exciting circuit of the same machine to regulate the excitation thereof, single phase contactors connected between each output terminal of one machine and the corresponding output terminal of the other machine, contactor actuating solenoids for each of said contactors and a clockwork controlled relay connected to said solenoids which is adapted to close said contactors successively at time intervals greater than the time required to establish normal voltage in said line after the closing of a contactor.

4. Apparatus for connecting in parallel two polyphase electro-magnetic machines having Y connected output terminals, each machine having a neutral terminal and said neutral terminals being connected together, said apparatus comprising automatic voltage regulating means connected across a pair of the output terminals of one of said machines and across the exciting circuit of the same machine to regulate the excitation thereof, single phase contactors connected between each output terminal of one machine and the corresponding output terminal of the other machine, contactor actuating solenoids for each contactor, and a clockwork controlled relay connected across a different pair of the output terminals of one of said machines and across each of said contactor solenoids which is adapted to successively actuate said contactors at time intervals greater than the length of time required to establish normal voltage in said line after the closing of a contactor.

5. Apparatus as claimed in claim 1 in which at least one of said electro-magnetic machines is an alternator and one alternator which is already in service has an exciter, the excitation of which is controlled by a voltage regulator for regulating the voltage at the alternator terminals under substantially stable conditions, said voltage regulator comprising regulating resistances connected in parallel across the terminals of a storage battery and swept by a movable contact arm connected to the terminals of the exciter winding for the alternator, and a quick action device supplementing said voltage regulator during all changes in load, said quick action device comprising a transformer, the primary of which is connected across at least one phase of the alternator, while its secondary is connected to the supply circuit of a rectifier, and a driving transformer, the primary of which is fed by the output circuit of said rectifier, and the secondary of which supplies an auxiliary winding exciting the alternator which is already in service.

6. Apparatus as claimed in claim 5 which comprises a variable reactance connected between said voltage transformer and said rectifier, the exciting winding of said variable reactance being fed by an auxiliary assembly comprising a driving transformer, a second rectifier supplying the primary of said driving transformer, and a second transformer supplying the second rectifier and connected to an output terminal of said alternator, thus creating upon a sudden change in the flow of current delivered by the alternator, a current which saturates the variable reactance so that the variable reactance permits the auxiliary excitation current produced by said quick acting device to pass through to the exciting winding of the alternator and supplement the excitation thereof.

7. Apparatus as claimed in claim 3 in which said machines are Y connected and said each solenoid is connected between the phase closed by its contactor and neutral.

8. Apparatus according to claim 1 in which one of said polyphase electro-magnetic machines comprises armature phases consisting of two parallel circuits each, and each of said circuits is connected to the corresponding phase of at least one other polyphase electric machine through a separate switch.

9. Apparatus as claimed in claim 4 in which the machine across which said voltage regulator is connected is an alternator of the high reactance type and the other machine is a squirrel cage motor.

10. A method for connecting in parallel a plurality of polyphase electro-magnetic machines having neutral terminals, said method comprising the steps of connecting together said neutral terminals, next connecting a first phase of one of said machines to a first phase of at least one other machine, and then connecting second and third phases of said first mentioned machine to second and third phases of said at least one other machine respectively, after normal voltage in the phase first connected has been established.

11. A method as claimed in claim 10 for use in connecting polyphase electrical machines according to which the third phase of said first mentioned machine is connected to the third phase of said at least one other machine at the same time that the second phases of said machines are connected.

12. A method as claimed in claim 10 for use in connecting polyphase electrical machines according to which the third phase of said first mentioned machine is connected to the third phase of said at least one other machine after normal voltage in said second phase has been established.

13. Apparatus for connecting in parallel a plurality of polyphase electro-magnetic machines having neutral terminals, comprising an individual switch through which each phase of at least one of said machines is connected to the corresponding phase of at least one other machine with which it is to be connected in parallel and an electrical connection between said neutral points, said apparatus comprising means for successively actuating said switches at predetermined time intervals, and at least one single phase electrical device connected across the two phases which are the last to be connected.

No references cited.